US009560239B2

(12) United States Patent
Li et al.

(10) Patent No.: US 9,560,239 B2
(45) Date of Patent: Jan. 31, 2017

(54) METHOD AND APPARATUS FOR GENERATING DOTS IN IMAGE REPRODUCTION

(71) Applicants: Peking University Founder Group Co., Ltd., Beijing (CN); Beijing Founder Electronics Co., Ltd., Beijing (CN)

(72) Inventors: Haifeng Li, Beijing (CN); Bin Yang, Beijing (CN); Xiangxing Wu, Beijing (CN)

(73) Assignees: PEKING UNIVERSITY FOUNDER GROUP CO., LTD., Beijing (CN); BEIJING FOUNDER ELECTRONICS CO., LTD., Beijing (CN)

( * ) Notice: Subject to any disclaimer, the term of this patent is extended or adjusted under 35 U.S.C. 154(b) by 0 days.

(21) Appl. No.: 14/785,232

(22) PCT Filed: Nov. 15, 2013

(86) PCT No.: PCT/CN2013/087188
§ 371 (c)(1),
(2) Date: Oct. 16, 2015

(87) PCT Pub. No.: WO2014/169636
PCT Pub. Date: Oct. 23, 2014

(65) Prior Publication Data
US 2016/0072981 A1    Mar. 10, 2016

(30) Foreign Application Priority Data
Apr. 17, 2013  (CN) .......................... 2013 1 0134006

(51) Int. Cl.
G06K 15/00   (2006.01)
H04N 1/405   (2006.01)
H04N 1/40    (2006.01)

(52) U.S. Cl.
CPC ............ *H04N 1/4055* (2013.01); *H04N 1/405* (2013.01); *H04N 1/40081* (2013.01)

(58) Field of Classification Search
CPC .. H04N 1/4055; H04N 1/405; H04N 1/40081; G06K 15/02

(Continued)

(56) References Cited

U.S. PATENT DOCUMENTS 6,091,849 A     7/2000 Spaulding et al.
2004/0160643 A1  8/2004 Sugizaki
(Continued)

FOREIGN PATENT DOCUMENTS

| CN | 1805499    | 7/2006 |
| CN | 102098416  | 6/2011 |
| CN | 102555417  | 7/2012 |
| CN | 102878958  | 1/2013 |
| WO | WO 95/05643 | 2/1995 |

OTHER PUBLICATIONS

Extended European Search Report for EP13882476.8, dated Nov. 21, 2016.

*Primary Examiner* — Douglas Tran
(74) *Attorney, Agent, or Firm* — Brinks Gilson & Lione (57) ABSTRACT

This invention discloses a method and apparatus for generating dots in image reproduction, and relates to the field of image reproduction in the printing industry. The method comprises performing a binarization process on a threshold matrix of one or more basic dots according to level thresholds to obtain a set of level-binarization matrixes corresponding to the threshold matrix; determining substitution binarization matrixes and auxiliary binarization matrixes from the set of level-binarization matrixes; performing a Boolean operation on the substitution binarization matrixes and the auxiliary binarization matrixes to generate resulted binarization matrixes; substituting binarization matrixes to be substituted in the set of level-binarization matrixes with the resulted binarization matrixes; and according to the substituted set of level-binarization matrixes, forming a substituted threshold matrix, and generating shape-varied dots according to the substituted threshold matrix. The shapes of dots with some grayscale in basic dots are changed by Boolean calculation among binarization matrices, thereby achieving the purposes of changing the overall shape of the basic dots and constructing dots with complicated shapes using dots with simple shapes, so that it is simple and easy to implement.

18 Claims, 6 Drawing Sheets

(58) Field of Classification Search
USPC .......................................... 358/1.1, 3.06, 1.9
See application file for complete search history.

(56) References Cited

U.S. PATENT DOCUMENTS

| | | | |
|---|---|---|---|
| 2006/0152767 A1* | 7/2006 | Asai | H04N 1/4051 |
| | | | 358/3.23 |
| 2006/0256385 A1 | 11/2006 | Takebe et al. | |
| 2013/0216137 A1* | 8/2013 | Washio | G06K 9/4604 |
| | | | 382/199 |

* cited by examiner

METHOD AND APPARATUS FOR GENERATING DOTS IN IMAGE REPRODUCTION

CROSS-REFERENCE TO RELATED APPLICATIONS

The present application is a §371 national stage application of PCT International Application No. PCT/CN2013/087188, filed Nov. 15, 2013, which application claims a right of priority to Chinese Patent Application No. 201310134006.3, filed Apr. 17, 2013, both of which are incorporated.

TECHNICAL FIELD

This invention relates to the field of image reproduction in printing industry, and particularly, to a method and apparatus for generating dots in image reproduction.

DESCRIPTION OF THE RELATED ART

In the printing field, dots are basic units of image reproduction. The morphology of dots directly affects whether printing products may correctly represent tone and color changes in manuscripts. Traditional shapes of basic dots comprise circular, square, oval, diamond and linear shapes. Different dot shapes present different variation rules in image reproduction so as to generate different reproduction effects.

Dots in term of screening methods are generally divided into AM screening dots and FM screen dots. AM screening dots have a constant spacing therebetween in which case image hierarchy is represented by different sizes of dots; FM screening dots have the same dot size in which case image hierarchy is represented by dot density. AM screening dots as widely used currently have fixed centers, and small dots spread from the center to the periphery according to particular pattern, so as to form dots in centralized distributions, for which the dot shape and screening angle depend on the spreading pattern of the dots.

Currently, there are some drawbacks in AM screening with basic dots: it is unable to represent subtle detail levels of an image in highlight and shadow portions, tending to lose small dots in highlight portions; on the other hand, however, as the dot size increases, dots are liable to joint with each other, causing tone hopping accordingly. In this case, it is necessary to replace the basic dots with dots in more complex shapes for printing. Complex dots are generally produced according to traditional dot generation methods, in which corresponding threshold matrixes are established according to varying patterns of dots, meaning that, for dots in complex shapes, complex mathematical equations must be developed, which is quite difficult in practical applications.

SUMMARY OF THE INVENTION

A method and apparatus for generating dots in image reproduction is provided in embodiments of this invention, for constructing dots in complex shapes to meet different requirements of printing adaptability.

A method for generating dots in image reproduction is provided in an embodiment of this invention, comprising: performing a binarization process on a threshold matrix of one or more basic dots according to level thresholds, to obtain a set of level-binarization matrixes corresponding to the threshold matrix; determining substitution binarization matrixes and auxiliary binarization matrixes from the set of level-binarization matrixes; performing a Boolean operation on the substitution binarization matrixes and the auxiliary binarization matrixes, to generate resulted binarization matrixes; substituting binarization matrixes to be substituted in the set of level-binarization matrixes with the resulted binarization matrixes; and according to the substituted set of level-binarization matrixes, forming a substituted threshold matrix, and generating shape-varied dots according to the substituted threshold matrix.

An apparatus for generating dots in image reproduction is provided in an embodiment of this invention, comprising: a binarization module for performing a binarization process on a threshold matrix of one or more basic dots according to level thresholds, to obtain a set of level-binarization matrixes corresponding to the threshold matrix; a selection determination module for determining substitution binarization matrixes and auxiliary binarization matrixes from the set of level-binarization matrixes; a calculation module for performing a Boolean operation on the substitution binarization matrixes and the auxiliary binarization matrixes, to generate resulted binarization matrixes; a substitution module for substituting binarization matrixes to be substituted in the set of level-binarization matrixes with the resulted binarization matrixes; a generation module for according to the substituted set of level-binarization matrixes, forming a substituted threshold matrix, and generating shape-varied dots according to the substituted threshold matrix.

In the embodiments of this invention, through selecting basic dots and binarizing these basic dots into multiple matrixes according to different gray scales, and performing a Boolean operation between these binarization matrixes to change the shapes at some gray scales of a basic dot, the morphology of the basic dot may be changed, i.e., constructing dots in a complex shape with simple dots. Compared to traditional dot generation methods, this method is simple and may produce new varying patterns while keeping advantages of the original dots, therefore has great flexibility.

DETAILED DESCRIPTION OF THE PREFERRED EMBODIMENT

With existing basic dots, it is difficult to meet demands for all available print materials or graphics, and delivery of graphic and text information from originals to printed materials cannot be implemented very well. For example, circular dots have poor performance on non-paper mediums (such as, plastic films), and may cause harmful effects, such as ink accumulation or irregular ink flow, due to the liquidity of the ink.

In order to solve the above-mentioned problems in the prior art, a method and apparatus for generating dots in image reproduction is provided in embodiments of this invention, in which dots in complex shapes are constructed through performing Boolean operations on basic dots, so as to meet different demands for printability, capable of achieving the delivery of graphic and text information from originals to printed materials very well.

Generating dots in complex shapes using Boolean operations commonly adopted in geometric modeling techniques may get twice the result with half the effort. The so-called Boolean operations combine two objects into a new one with Boolean operators (intersection ∩, union ∪ and difference −). Boolean operations on object A and object B are as follows:

Intersection: a set of dots included in both of A and B (A∩B)

Union: a set of dots included in A or B (A∪B)

Difference: a set of dots included in A but excluded from B (A−B)

Similar to Boolean operations adopted in geometric modeling, Boolean operations performed between dots construct complex shapes from simple shapes to reduce complexity and improve calculation efficiency.

Figure 1A:
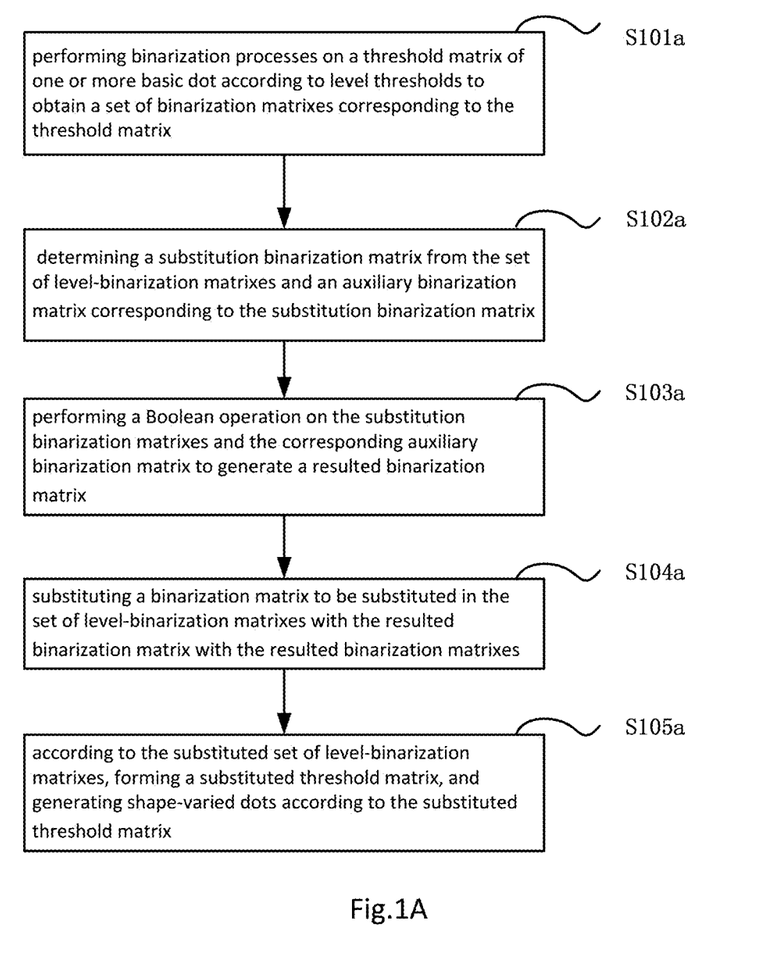
FIG. 1 is a flowchart of a dot generation method provided in an embodiment of this invention.

According to an embodiment of this invention, first, a method of generating dots in image reproduction is provided, as shown in FIG. 1A, comprising:

S101a: performing binarization processes on a threshold matrix of one or more basic dot according to level thresholds to obtain a set of binarization matrixes corresponding to the threshold matrix. The threshold matrix of each basic dot has a corresponding set of level-binarization matrixes.

S102a: determining a substitution binarization matrix from the set of level-binarization matrixes and an auxiliary binarization matrix corresponding to the substitution binarization matrix.

S103a: performing a Boolean operation on the substitution binarization matrixes and the corresponding auxiliary binarization matrix to generate a resulted binarization matrix.

S104a: substituting a binarization matrix to be substituted in the set of level-binarization matrixes with the resulted binarization matrix.

In an example, the substitution binarization matrixes and the binarization matrix to be substituted are the same binarization matrix in the set of level-binarization matrixes, i.e., the binarization matrix to be substituted is used as the substitution binarization matrixes to perform a Boolean operation with the auxiliary binarization matrix so as to obtain a new binarization matrix, i.e., the resulted binarization matrix. Then, the binarization matrix to be substituted is substituted with the resulted binarization matrix.

In another example, the substitution binarization matrixes and the binarization matrix to be substituted are the different binarization matrixes. For example, a resulted binarization matrix is generated through performing a Boolean operation on the substitution binarization matrixes and the auxiliary binarization matrix, and is used to substitute a binarization matrix to be substituted in the set of level-binarization matrixes. In this case, the binarization matrix to be substituted is not restricted to be the same binarization matrix as the substitution binarization matrixes.

S105a: forming a substituted threshold matrix from the substituted set of level-binarization matrixes, and generating shape-varied dots according to the substituted threshold matrix.

Figure 1B:
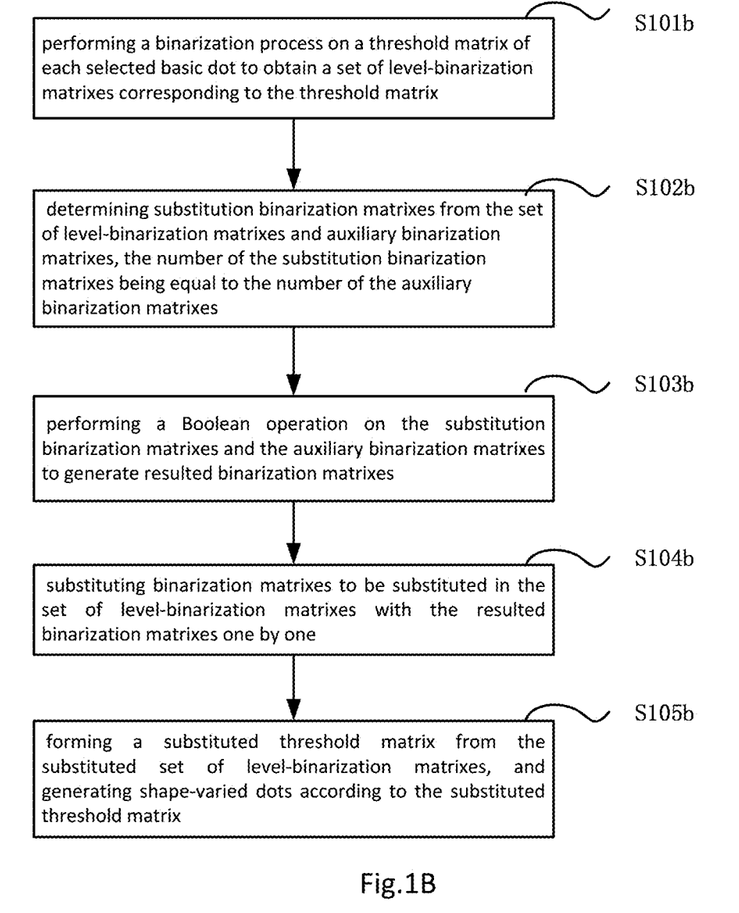
FIG. 1B is a flowchart of a dot generation method provided in another embodiment of this invention.

FIG. 1B is a flowchart of a method of generating dots in image reproduction provided in another embodiment of this invention.

As shown in FIG. 1B, S101b, perform a binarization process on a threshold matrix of each selected basic dot to obtain a set of level-binarization matrixes corresponding to the threshold matrix.

S102b: determine substitution binarization matrixes from the set of level-binarization matrixes and auxiliary binarization matrixes, the number of the substitution binarization matrixes being equal to the number of the auxiliary binarization matrixes. That is, the substitution binarization matrixes are binarization matrixes to be substituted.

S103b: perform a Boolean operation on the substitution binarization matrixes and the auxiliary binarization matrixes to generate resulted binarization matrixes. In the case that the set of selected substitution binarization matrixes and the set of the auxiliary binarization matrixes comprise the same binarization matrix, the binarization matrix may be only Booleaned with another auxiliary binarization matrix or substitution binarization matrix, i.e., such a binarization matrix in the set of substitution binarization matrixes may be only Booleaned with another auxiliary binarization matrix in the set of auxiliary binarization matrixes; similarly, such a binarization matrix in the set of auxiliary binarization matrix may be only Booleaned with another binarization matrix in the set of substitution binarization matrixes.

S104b: substitute binarization matrixes to be substituted in the set of level-binarization matrixes with the resulted binarization matrixes one by one, i.e., substitute corresponding substitution binarization matrixes with the resulted binarization matrixes one by one.

S105b: form a substituted threshold matrix from the substituted set of level-binarization matrixes, and generate shape-varied dots according to the substituted threshold matrix.

Before the implementation of the above embodiment of this invention, a selection of basic dots should be made according to the shape of dots desired. Because a dot is actually represented by overlapping multiple layers of images with different gray scales, each binarization matrix formed through the binarization process performed on a threshold matrix of the basic dot corresponds to an image of a certain gray scale, analogous to separating various layers of the overlapped basic dot according to their gray scale levels. Thereby, substitution binarization matrixes having corresponding unfavorable gray scale images may be recognized clearly and auxiliary binarization matrixes that may be Booleaned with these substitution binarization matrixes may be selected carefully. Upon a Boolean operation thereof, substitution binarization matrixes in the set of level-binarization matrixes may be substituted in their positions with the new resulted binarization matrixes. Then the substituted set of level-binarization matrixes may be restored to a varied threshold matrix, by which shape-varied dots may be generated.

It may be understood that when substituting substitution binarization matrixes with auxiliary binarization matrixes, a binarization matrix may be not only a substitution binarization matrix but also an auxiliary binarization matrix, in which case in the Boolean operation, a stagger-operation is required, because Boolean operations performed on the same matrix itself is meaningless.

Note that basic dots may be selected empirically or according to other criteria. The manner of selection does not have limitations thereof and is not in the category of this invention.

It may be understood that one or more basic dots may be selected. The Boolean operation may be performed on various layers of a basic dot or layers of different basic dots.

On the basis of the above embodiment, further, a binarization process may be performed on the threshold matrix of each selected basic dot to obtain a set of level-binarization matrixes corresponding to the threshold matrix, particularly comprising:

according to the number of elements in the threshold matrix, normalizing the threshold matrix into N levels according to gray scale levels.

With a threshold K, each element M in the threshold matrix is compared with the threshold K to obtain a K-level-binarization matrix according to the comparison result, K∈{0, 1, 2, . . . N−1}, so that N level-binarization matrixes are obtained; for example, if the threshold K is less than or equal to an element M of the threshold matrix, the value of an element corresponding to the element M in the K-level-binarization matrix is 255; if the threshold K is greater than the element M in the threshold matrix, the value of an element corresponding to element M in the K-level-binarization matrix is 0. In other words, with a threshold K, it is compared with each element at a level consistent with the value K of the N levels to get N binarization matrixes (K∈{0, 1, 2, . . . N−1) according to the comparison result.

These N binarization matrixes are a set of level-binarization matrixes corresponding to the threshold matrix.

In this embodiment, a particular binarization process of a threshold matrix is further provided, in which a threshold matrix is normalized into N levels and each of the N levels is compared with a threshold K to obtain N binarization matrixes.

Comparing the threshold K with a corresponding level of the N levels means that, taking a halftone dot as an example, the levels may be 0-255 according to gray scale level; when K=0, a comparison is made with elements at level 0, i.e., the number of the level to be compared is equal to K. finally, 256 binarization matrixes are obtained.

A comparison rule used in the comparison with the threshold K is determined. Further, the above comparison rule is as follows:

if the current threshold K is less than a compared element M, in the binarization matrix obtained after the comparison, the value corresponding to element M is 255;

if the current threshold K is greater than a compared element M, in the binarization matrix obtained after the comparison, the value corresponding to element M is 0.

In the above embodiment, particularly, as to the comparison of each level, each element M at this level is compared with the current threshold K; if greater than the threshold K, the resulted value is 255, representing black; if less than the threshold K, the resulted value is 0, representing white.

For a better understanding of the binarization process of a basic dot, a particular embodiment is provided:

$$T_1 = \begin{bmatrix} tl_0 & tl_1 & \ldots & tl_{u-1} \\ tl_u & tl_{u+1} & \ldots & tl_{2u\_1} \\ \vdots & \vdots & \vdots & \vdots \\ tl_{u(v-1)} & tl_{u(v-1)+1} & \ldots & tl_{u \times v-1} \end{bmatrix}$$

The above $T_1$ is selected from a threshold matrix of a basic dot. With $T_1$ as an example, the number of different elements in the threshold matrix is the maximum number of levels that may be reproduced by the basic dot represented by the threshold matrix. As to a threshold matrix in a size of u*v, the maximum number of levels is N=u*v+1. The threshold matrix is normalized into N levels (N>0), with k as a threshold, the threshold matrix is binarized to obtain N binarization matrixes. That is, the threshold K is compared with the value M (0≤M≤N−1) of each element, if K>M, the value of the element in the binarized threshold matrix is 0; otherwise, the value of the element is 255. A matrix after K-level-binarization is:

$$(0 : 1\text{-}binarization the\ va$$
$$(0\ \ inarization the\ vaule$$
$$\vdots$$
$$(0\ (0\ \ inariza \leq i \leq u \times v - 1)$$

Wherein, K,

The matrix is binarized using all levels as thresholds to finally obtain a resulted set as follows:

$$H_1 = \{Tk_1 \mid 0 \leq k \leq N-1\}$$
$$H_2 = \{Tk_2 \mid 0 \leq k \leq N-1\}$$
$$\vdots$$
$$H_n = \{Tk_n \mid 0 \leq k \leq N-1\}$$

The above resulted set is a set of level-binarization matrixes of the basic dot.

Based on the above embodiment, a further description of selecting one or more basic dots will be given in detail.

In an example, the substitution binarization matrixes and the auxiliary binarization matrixes are all selected from the set of level-binarization matrixes of the same basic dot.

In the case of selecting more than one basic dot, the auxiliary binarization matrixes and the substitution binarization matrixes may be selected from different sets of level-binarization matrixes of those basic dots. For example, all substitution binarization matrixes may be selected from a set of level-binarization matrixes, and all or some auxiliary binarization matrixes may be selected from another set of level-binarization matrixes.

In the above embodiment, binarization matrixes to be substituted are selected from the set of matrixes after binarization. The substitution binarization matrixes may be one or more matrixes, because each matrix in the set of level-binarization matrixes represents a layer of image of the basic dot, and it may be determined which layer(s) is unfavorable upon an analysis of image thereof, thereby determining the number of substitution binarization matrixes.

Similarly, upon an image analysis, auxiliary binarization matrixes to be Booleaned with the substitution binarization matrixes may be determined.

Particularly, the substitution binarization matrixes and the auxiliary binarization matrixes may be determined in the following manner:

Determine the material to be printed;

Compare each image corresponding to a binarization matrix in the set of level-binarization matrix with valid and invalid images in a database showing performance of print images on the print material;

Determine binarization matrixes consistent with the valid images as auxiliary binarization matrixes;

Determine binarization matrixes consistent with the invalid images as substitution binarization matrixes.

In the above embodiment, comparison against a database is adopted in the selection of the auxiliary binarization matrixes and the substitution binarization matrixes. Because different images have different performance on different materials, for different materials, a database of performance of different images on the material is established, in which images with good performance are labeled as valid images and images with poor performance are labeled as invalid images. Which images are valid images and which images are invalid may be determined as needed, for example, by manual labeling in advance.

After a Boolean operation performed on the substitution binarization matrixes and the auxiliary binarization matrixes one by one, the resulted binarization matrix represent a new image. Upon substituting corresponding substitution binarization matrixes with these resulted binarization matrixes, a new dot may be generated from the set of level-binarization matrixes, benefiting from the advantages of the original basic dot, and overcoming drawbacks of the original basic dot after the Boolean operation as well.

It may be understood that, in the selection of the basic dot, if the substitution binarization matrixes and the auxiliary binarization matrixes may be determined in the case of selecting only one basic dot, it is unnecessary to select a plurality of basic dots, and the Boolean operation may be performed on the threshold matrix of the basic dot itself.

If it is unable to obtain all or some of the auxiliary binarization matrixes from one selected basic dot, it is necessary to select a plurality of basic dots from which the auxiliary binarization matrixes are determined.

It may be understood that, when a plurality of basic dots are selected, there is at least one main dot, and other basic dots are auxiliary dots. All the substitution binarization matrixes are selected from a set of level-binarization matrixes corresponding to the main dot.

As to the determination of the main dot, in the case of selecting a plurality of basic dots, it is required to determine which basic dot is the main dot, i.e., determining the basic dot pattern. Other auxiliary dots are used to modify the pattern of the main dot to generate a favorite pattern.

For example, assume that binarization matrixes corresponding to gray scales 25-45 in a set of level-binarization matrixes are substitution binarization matrixes, and binarization matrixes of gray scales 30-50 are auxiliary binarization matrixes, gray scales 30-45 are "overlapped" binarization matrixes. In the Boolean operation, an overlapped binarization matrix cannot be Booleaned with itself, for which a "staggered" operation is required. The operation rule of a substitution binarization matrix and a auxiliary binarization matrix may be specified as needed, and is not in the category discussed and protected in this invention.

For a halftone dot, each set of level-binarization matrixes comprises 256 binarization matrixes.

For a better understanding of the technical solution of this invention, some embodiments of dot generation will be introduced in detail.

Embodiment 1

Figure 2:
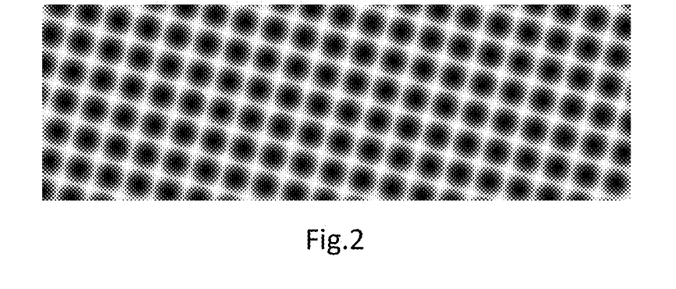
FIG. 2 is a schematic diagram of 75° circular dots provided in an embodiment of this invention.
Figure 3:
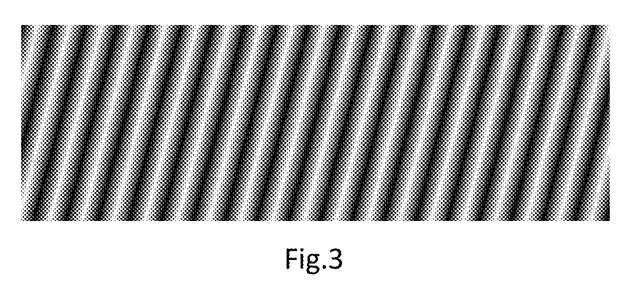
FIG. 3 is a schematic diagram of 75° linear dots provided in an embodiment of this invention.

S201, in this embodiment, 75° circular dots and linear dots are selected, as shown in FIG. 2 and FIG. 3. Some data of their corresponding threshold matrixes T1 and T2 are as follows:

$$T_1 = \begin{bmatrix} 199 & 216 & 227 & 232 & 231 & 220 & 206 \\ 214 & 233 & 242 & 246 & 244 & 234 & 219 \\ 222 & 240 & 249 & 254 & 250 & 241 & 228 \\ 224 & 243 & 253 & 255 & 252 & 245 & 229 \\ 218 & 237 & 247 & 251 & 248 & 238 & 226 \\ 208 & 225 & 235 & 239 & 236 & 230 & 215 \\ 190 & 207 & 217 & 223 & 221 & 213 & 198 \end{bmatrix}$$

$$T_2 = \begin{bmatrix} 81 & 114 & 147 & 180 & 207 & 233 & 250 \\ 110 & 143 & 176 & 209 & 237 & 252 & 230 \\ 139 & 172 & 205 & 239 & 254 & 234 & 200 \\ 168 & 201 & 235 & 255 & 238 & 204 & 171 \\ 197 & 231 & 253 & 240 & 208 & 175 & 142 \\ 227 & 251 & 236 & 210 & 179 & 146 & 113 \\ 249 & 232 & 206 & 181 & 150 & 117 & 84 \end{bmatrix}$$

Wherein, T1 is selected as a main matrix and T2 is an Auxiliary matrix.

Figure 4:
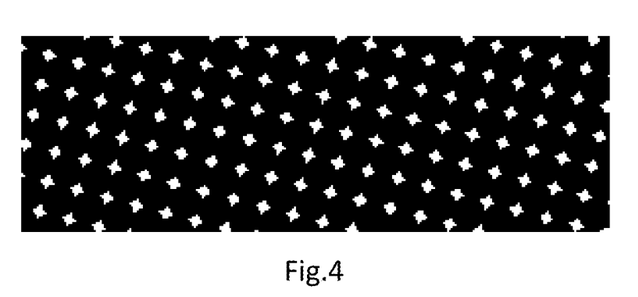
FIG. 4 is a schematic diagram of 75° circular dots at a 234 level in the case of 256 gray-scale level provided in an embodiment of this invention.

S202, the value of each element of the threshold matrixes T1 and T2 and is normalized to 256 levels. Then, matrixes T1 and T2 are binarized using K as a threshold to obtain TK1 and TK2 (0≤k≤255). Finally, binarization data of the 256 levels is written to a set of level-binarization matrixes H1 and a set of level-binarization matrixes H2. For example, the binarization matrix is TP1 when the threshold K is P and the binarization matrix is TP2 when the threshold K is q, some data of the resulted matrixes is as follows:

P=234, for example, $$Tp_1 = \begin{bmatrix} 0 & 0 & 0 & 0 & 0 & 0 & 0 \\ 0 & 0 & 255 & 255 & 255 & 0 & 0 \\ 0 & 255 & 255 & 255 & 255 & 255 & 0 \\ 0 & 255 & 255 & 255 & 255 & 255 & 0 \\ 0 & 255 & 255 & 255 & 255 & 255 & 0 \\ 0 & 0 & 0 & 255 & 255 & 0 & 0 \\ 0 & 0 & 0 & 0 & 0 & 0 & 0 \end{bmatrix}$$

Figure 5:
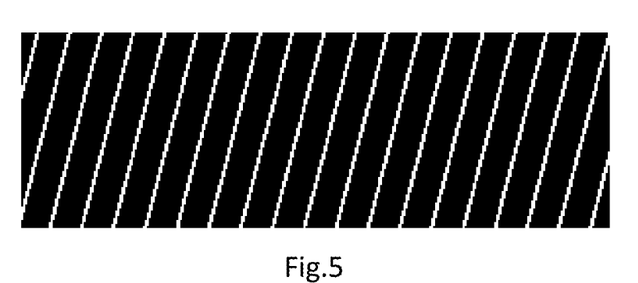
FIG. 5 is a schematic diagram of 75° linear dots at a 241 level in the case of 256 gray-scale level provided in an embodiment of this invention.

Q=241, for example, $$Tq_2 = \begin{bmatrix} 0 & 0 & 0 & 0 & 0 & 0 & 255 \\ 0 & 0 & 0 & 0 & 0 & 255 & 0 \\ 0 & 0 & 0 & 0 & 255 & 0 & 0 \\ 0 & 0 & 0 & 255 & 0 & 0 & 0 \\ 0 & 0 & 255 & 0 & 0 & 0 & 0 \\ 0 & 255 & 0 & 0 & 0 & 0 & 0 \\ 255 & 0 & 0 & 0 & 0 & 0 & 0 \end{bmatrix}$$

At this point, the pattern of the corresponding dot is shown in FIGS. 4 and 5.

S203, substitution binarization matrixes $TP_{1i}$ are determined from the main matrix, and auxiliary binarization matrixes $TP_{2i}$ are determined from the auxiliary matrix. For each element in the substitution binarization matrix and the auxiliary binarization matrix, if $TP_{1i} > Tq_{2i}$, ($i \in \{0, 1, 2 \ldots u \times v-1\}$), the resulted binarization matrix of this element $HK = Tp_{1i}$; otherwise, $HK = Tq_{2i}$ (0 rwise, HK The substitution binarization matrixes $Tp_{1i}$ are substituted by the resulted binarization matrixes Hk.

Figure 6:
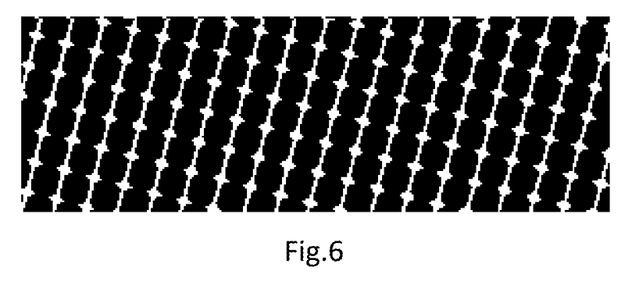
FIG. 6 is a schematic diagram of dots after a "union" operation performed on FIGS. 4 and 5 provided in an embodiment of this invention.

For example, Tp1 may be unioned with Tp2 and the resulted binarization matrix HK (some data) is as follows:

$$Hk = Tp_1 \cup Tq_2 = \begin{bmatrix} 0 & 0 & 0 & 0 & 0 & 0 & 255 \\ 0 & 0 & 255 & 255 & 255 & 255 & 0 \\ 0 & 255 & 255 & 255 & 255 & 255 & 0 \\ 0 & 255 & 255 & 255 & 255 & 255 & 0 \\ 0 & 255 & 255 & 255 & 255 & 255 & 0 \\ 0 & 255 & 0 & 255 & 255 & 0 & 0 \\ 255 & 0 & 0 & 0 & 0 & 0 & 0 \end{bmatrix}$$

At this point, a pattern of a corresponding gray scale of the dot is shown in FIG. 6.

S204, a threshold matrix is restored according to the substituted set of level-binarization matrixes H1. The pattern of dot corresponding to this threshold matrix is the required dot.

Embodiment 2

Figure 7:
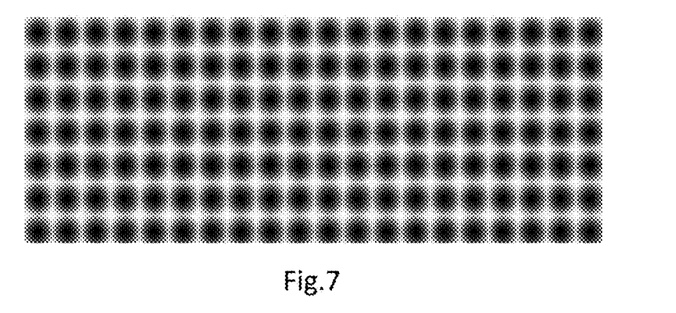
FIG. 7 is a schematic diagram of 0° circular dots provided in an embodiment of this invention.

S301, 75° circular dots are selected as shown in FIG. 7. A corresponding threshold matrixes T1 is as follows (some data):

$$T_1 = \begin{bmatrix} 56 & 39 & 28 & 23 & 24 & 35 & 49 \\ 41 & 22 & 13 & 9 & 11 & 21 & 36 \\ 33 & 15 & 6 & 1 & 5 & 14 & 27 \\ 31 & 12 & 3 & 0 & 2 & 10 & 26 \\ 37 & 18 & 8 & 4 & 7 & 17 & 29 \\ 47 & 30 & 20 & 16 & 19 & 25 & 40 \\ 65 & 48 & 38 & 32 & 34 & 42 & 57 \end{bmatrix}$$

S302, because it is a halftone dot, N=256, the value of each element in the threshold matrix T1 is read and normalized to 256 levels. Then, the matrix T1 is binarized using K as a threshold to obtain Tk(0≤k≤255). These 256 binarization matrixes are written into a set H1.

Figure 8:
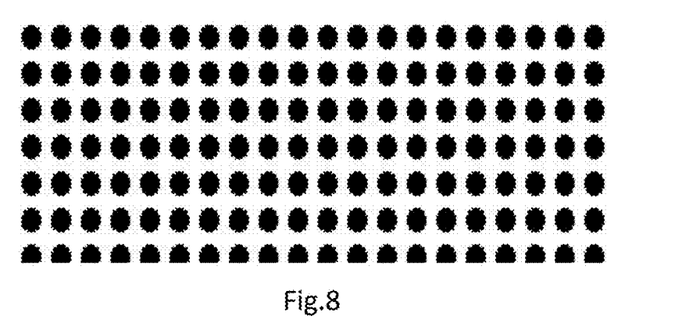
FIG. 8 is a schematic diagram of 0° circular dots at a 90 level in the case of 256 gray-scale level provided in an embodiment of this invention.
Figure 9:
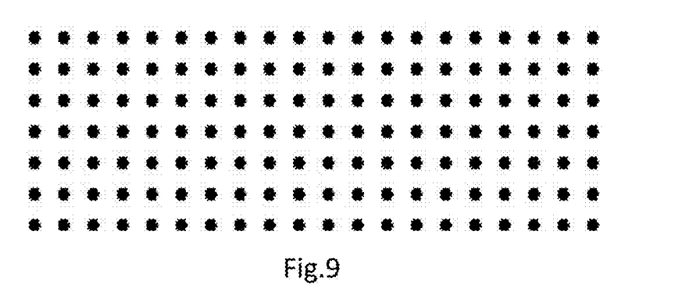
FIG. 9 is a schematic diagram of 0° circular dots at a 34 level in the case of 256 gray-scale level provided in an embodiment of this invention.
Figure 10:
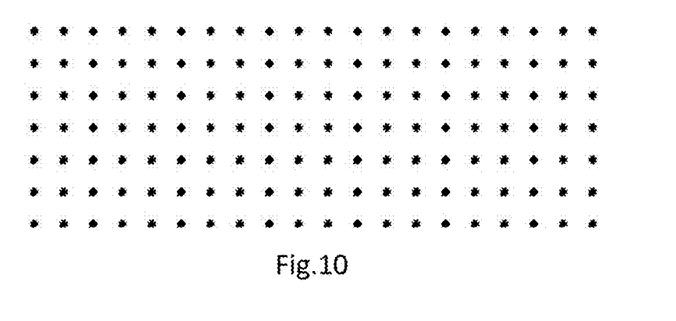
FIG. 10 is a schematic diagram of 0° circular dots at a 14 level in the case of 256 gray-scale level provided in an embodiment of this invention.

T1 is binarized when the threshold K is equal to different levels A=90, B=34 and C=14 respectively to obtain binarization matrixes TA, TB and TC as follows (some data):

$$TA = \begin{bmatrix} 0 & 0 & 0 & 0 & 0 & 0 & 0 \\ 0 & 0 & 0 & 0 & 0 & 0 & 0 \\ 0 & 0 & 0 & 0 & 0 & 0 & 0 \\ 0 & 0 & 0 & 0 & 0 & 0 & 0 \\ 0 & 0 & 0 & 0 & 0 & 0 & 0 \\ 0 & 0 & 0 & 0 & 0 & 0 & 0 \\ 0 & 0 & 0 & 0 & 0 & 0 & 0 \end{bmatrix}$$

$$TB = \begin{bmatrix} 255 & 255 & 0 & 0 & 0 & 255 & 255 \\ 255 & 0 & 0 & 0 & 0 & 0 & 255 \\ 0 & 0 & 0 & 0 & 0 & 0 & 0 \\ 0 & 0 & 0 & 0 & 0 & 0 & 0 \\ 255 & 0 & 0 & 0 & 0 & 0 & 0 \\ 255 & 0 & 0 & 0 & 0 & 0 & 255 \\ 255 & 255 & 255 & 0 & 0 & 255 & 255 \end{bmatrix}$$

$$TC = \begin{bmatrix} 255 & 255 & 255 & 255 & 255 & 255 & 255 \\ 255 & 255 & 0 & 0 & 0 & 255 & 255 \\ 255 & 255 & 0 & 0 & 0 & 0 & 255 \\ 255 & 0 & 0 & 0 & 0 & 0 & 255 \\ 255 & 255 & 0 & 0 & 0 & 255 & 255 \\ 255 & 255 & 255 & 255 & 255 & 255 & 255 \\ 255 & 255 & 255 & 255 & 255 & 255 & 255 \end{bmatrix}$$

TA is selected as the substitution binarization matrix and TB and TC are auxiliary binarization matrixes. The patterns of the corresponding dots are shown in FIGS. 8, 9 and 10.

Figure 11:
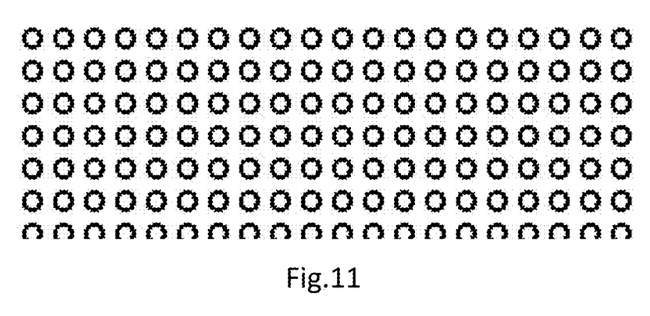
FIG. 11 is a schematic diagram of the result of a subtraction operation performed on FIGS. 8 and 9 provided in an embodiment of this invention.

S303, a Boolean operation is performed on TA, TB and TC. The rule of the particular Boolean operation may be specified as needed. For example, a difference operation is performed on TA and TB at first, for each element in the two binarization matrixes, if $TA_i \neq TB_i$ ($i \in \{0, 1, 2 \ldots u \times v-1\}$), the binarized result of this element is $HK_i = 0$; otherwise, $HK_i = 255$ ($0 \leq k \leq 255$). Each element in the matrix is traversed and is calculated according to the above rule. Finally a set of binarized data HK after the difference operation is obtained for level K. the binarization matrix TD upon the difference operation performed on TA and TB is as follows (some data):

$$Hk = TD = TA - TB = \begin{bmatrix} 0 & 0 & 255 & 255 & 255 & 0 & 0 \\ 0 & 255 & 255 & 255 & 255 & 255 & 0 \\ 255 & 255 & 255 & 255 & 255 & 255 & 255 \\ 255 & 255 & 255 & 255 & 255 & 255 & 255 \\ 0 & 255 & 255 & 255 & 255 & 255 & 255 \\ 0 & 255 & 255 & 255 & 255 & 255 & 0 \\ 0 & 0 & 0 & 255 & 255 & 0 & 0 \end{bmatrix}$$

At this point, TD substitutes TA as a main matrix and TC is an auxiliary binarization matrix. The pattern of corresponding dots is shown in FIG. 11.

Figure 12:
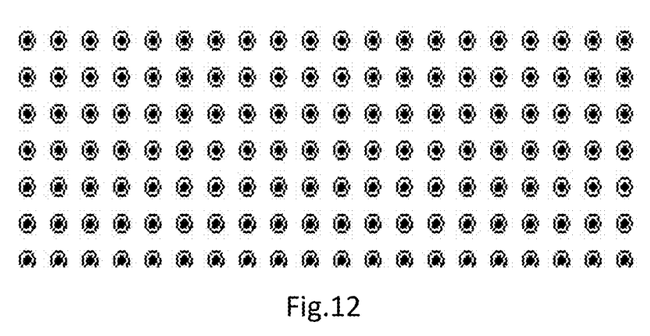
FIG. 12 is a schematic diagram of the result of a union operation performed on FIGS. 10 and 11 provided in an embodiment of this invention.

TD is unioned with TC. For each element in the two binarization matrixes, if $TD_i > TC_i$ ($i \in \{0, 1, 2 \ldots u \times v-1\}$), the resulted binarized data $HK_i$ of this element is $HK_i = TD_i$; otherwise, $HK_i = TC_i$. Each element in the matrix is traversed for the above operation, finally a binarization data set HK' upon the union operation is obtained ($0 \leq k \leq 255$) for level K. The result of the union operation performed on TD and TC is as follows (some data), a pattern of gray scale dots corresponding to this binarization matrix is shown in FIG. 12.

$$Hks = TD \cup TC = \begin{bmatrix} 0 & 0 & 255 & 255 & 255 & 0 & 0 \\ 0 & 255 & 0 & 0 & 0 & 255 & 0 \\ 255 & 255 & 0 & 0 & 0 & 0 & 255 \\ 255 & 0 & 0 & 0 & 0 & 0 & 255 \\ 0 & 255 & 0 & 0 & 0 & 255 & 255 \\ 0 & 255 & 255 & 255 & 255 & 255 & 0 \\ 0 & 0 & 0 & 255 & 255 & 0 & 0 \end{bmatrix}$$

S204, the binarization matrix TA is substituted by a resulted binarization matrix corresponding to HK', i.e., a binarization matrix corresponding to the gray scale of 90. The pattern corresponding to a threshold matrix upon the substitution is that of dots obtained through the difference operation followed by the union operation.

Figure 13:
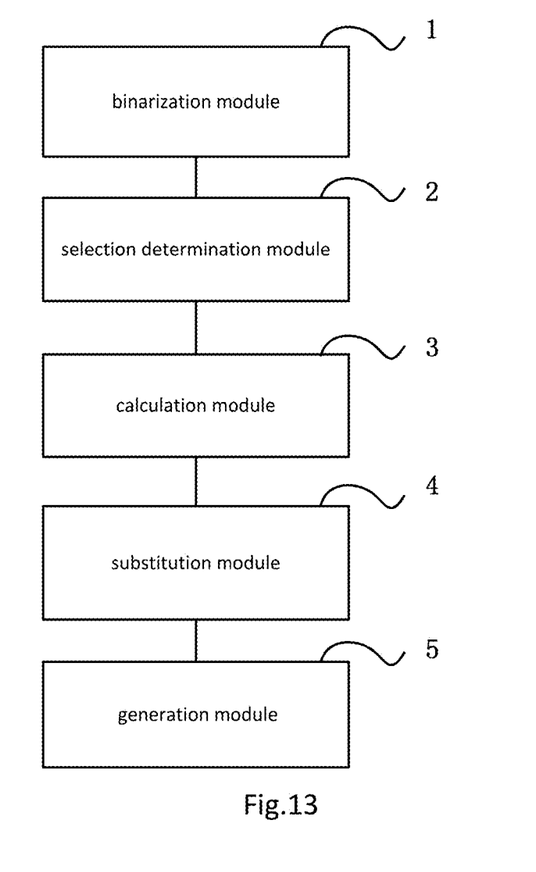
FIG. 13 is a schematic diagram of the structure of a dot generation apparatus provided in an embodiment of this invention.

Corresponding to the above method, an apparatus for generating dots in image reproduction is further provided in an embodiment of this invention, as shown in FIG. 13, comprising: a binarization module 1 for performing a binarization process on a threshold matrix of one or more basic dots according to level thresholds, to obtain a set of level-binarization matrixes corresponding to the threshold matrix; a selection determination module 2 for determining substitution binarization matrixes and auxiliary binarization matrixes from the set of level-binarization matrixes; a calculation module 3 for performing a Boolean operation on the substitution binarization matrixes and the auxiliary binarization matrixes, to generate resulted binarization matrixes; a substitution module 4 for substituting binarization matrixes to be substituted in the set of level-binarization matrixes with the resulted binarization matrixes; a generation module 5 for according to the substituted set of level-binarization matrixes, forming a substituted threshold matrix, and generating shape-varied dots according to the substituted threshold matrix.

For functions and effects of various modules shown in FIG. 13, reference may be made to corresponding description of the above method embodiment, which will not be described in detail for brevity.

In a particular embodiment, the binarization module 1 is particularly used to perform a binarization process on the threshold matrix of each selected basic dot to obtain a set of level-binarization matrixes corresponding to the threshold matrix; the selection determination module 2 is particularly used to determine binarization matrixes to be substituted and auxiliary binarization matrixes, the number of substitution binarization matrixes being equal to the number of the auxiliary binarization matrixes; the substitution binarization matrixes and the binarization matrixes to be substituted are the same binarization matrixes in the set of level-binarization matrixes, i.e., the binarization matrixes to be substituted which are used as the substitution binarization matrixes are Booleaned with the auxiliary binarization matrixes to obtain new binarization matrixes, i.e., resulted binarization matrixes, then the binarization matrixes to be substituted are substituted by the resulted binarization matrixes; the calculation module 3 is particularly used to perform a Boolean operation on the substitution binarization matrixes and the auxiliary binarization matrixes to generate resulted binarization matrixes, when the selected substitution binarization matrixes and the auxiliary binarization matrixes comprise the same binarization matrix, such a binarization matrix may be only Booleaned with another auxiliary binarization matrix or substitution binarization matrix; the substitution module 4 is particularly used to substitute corresponding substitution binarization matrixes with the resulted binarization matrixes one by one; the generation module 5 is particularly used to, according to the substituted set of level-binarization matrixes, form a substituted threshold matrix, and generate shape-varied dots according to the substituted threshold matrix.

In this embodiment, the binarization module performs a binarization process on the threshold matrix of a selected basic dot, the selection determination module determines substitution binarization matrixes and auxiliary binarization matrixes, the calculation module performs a Boolean operation, and the substitution module substitutes binarization matrixes according to the calculation result, and finally the generation module generates a shape-varied dot according to the substituted threshold matrix.

Based on the above embodiment, the selection determination module is further used to: determine a print material; compare each image corresponding to a binarization matrix in the set of level-binarization matrix with valid and invalid images in a database showing performance of print images on the print material; determine binarization matrixes consistent with the valid images as auxiliary binarization matrixes; and determine binarization matrixes consistent with the invalid images as substitution binarization matrixes.

Based on the above embodiment, the binarization module is further used to:

with a threshold K, compare each element M in the threshold matrix with the threshold K at a level consistent with K in the N level to obtain N binarization matrixes according to the comparison result, $K \in \{0, 1, 2, \ldots N-1\}$; the N binarization matrixes are the set of level-binarization matrixes corresponding to the threshold matrix.

The rule of the comparison may be as follows: if the current threshold K is less than a compared element M, the value of an element in the binarization matrix after comparison is 255; if the current threshold K is greater than the compared element M, the value of the element in the binarization matrix after comparison is 0.

The selection determination module may be particularly used to:

In the case of one basic dot selected, select all of the substitution binarization matrixes and the auxiliary binarization matrixes from the same set of level-binarization matrixes;

In the case of a plurality of basic dots selected, including at least one main dot and other ones as auxiliary dots, select all of the substitution binarization matrixes from a set of level-binarization matrixes of the main dot.

As to a halftone dot, each set of level-binarization matrixes comprises 256 binarization matrixes.

Herein, one or more computer-readable mediums having computer-executable instructions thereon is (are) provided, the instructions, when executed on a computer, executing a method of generating dots in image reproduction, the method comprising: performing a binarization process on a threshold matrix of one or more basic dots according to level thresholds, to obtain a set of level-binarization matrixes corresponding to the threshold matrix; determining substitution binarization matrixes and auxiliary binarization matrixes from the set of level-binarization matrixes; performing a Boolean operation on the substitution binarization matrixes and the auxiliary binarization matrixes, to generate resulted binarization matrixes; substituting binarization matrixes to be substituted in the set of level-binarization matrixes with the resulted binarization matrixes; and according to the substituted set of level-binarization matrixes, forming a substituted threshold matrix, and generating shape-varied dots according to the substituted threshold matrix.

In summary, the dot generation method provided in this invention may form dots in complex shapes from dots in simple shapes, and is simple as compared with traditional dot generation methods. In theory, it may generate dots in any shapes. Through adjusting a Boolean operation (intersection, union, difference) performed at a certain level, or a Boolean operation performed on binarization matrixes at different levels, the varying pattern of the resulted dot may not only keep consistent to a certain extent with the original dot and thus remaining advantages thereof, but also generate new variations, having greater flexibility accordingly.

In image reproduction using dots generated according to this method, drawbacks of regular AM dots in highlighted and shadowed image representation may be solved effectively, and tone/color variations in originals may be reproduced very well.

Those skilled in the art should understand that the embodiments of this application can be provided as method, system or products of computer programs. Therefore, this application can use the forms of entirely hardware embodiment, entirely software embodiment, or embodiment combining software and hardware. Moreover, this application can use the form of the product of computer programs to be carried out on one or multiple storage media (including but not limit to disk memory, CD-ROM, optical memory etc.) comprising programming codes that can be executed by computers.

This application is described with reference to the method, equipment (system) and the flow charts and/or block diagrams of computer program products according to the embodiments of the present invention. It should be understood that each flow and/or block in the flowchart and/or block diagrams as well as the combination of the flow and/or block in the flowchart and/or block diagram can be achieved through computer program commands Such computer program commands can be provided to general computers, special-purpose computers, embedded processors or any other processors of programmable data processing equipment so as to generate a machine, so that a device for realizing one or multiple flows in the flow diagram and/or the functions specified in one block or multiple blocks of the block diagram is generated by the commands to be executed by computers or any other processors of the programmable data processing equipment.

Such computer program commands can also be stored in readable memory of computers which can lead computers or other programmable data processing equipment to working in a specific style so that the commands stored in the readable memory of computers generate the product of command device; such command device can achieve one or multiple flows in the flowchart and/or the functions specified in one or multiple blocks of the block diagram.

Such computer program commands can also be loaded on computers or other programmable data processing equipment so as to carry out a series of operation steps on computers or other programmable equipment to generate the process to be achieved by computers, so that the commands to be executed by computers or other programmable equipment achieve the one or multiple flows in the flowchart and/or the functions specified in one block or multiple blocks of the block diagram.

Apparently, those skilled in the art can make various modifications and alterations to this invention without deviating from the spirit and scope of this invention. Therefore, if such modifications and alterations belong to scope of the claims of this invention and their equivalent technology, this invention also intends to contain such modifications and alterations.

What is claimed is:

1. A method for generating dots in image reproduction, comprising:
   performing a binarization process on a threshold matrix of one or more basic dots according to level thresholds to obtain a set of level-binarization matrixes corresponding to the threshold matrix;
   determining substitution binarization matrixes and auxiliary binarization matrixes from the set of level-binarization matrixes;
   performing a Boolean operation on the substitution binarization matrixes and the auxiliary binarization matrixes to generate resulted binarization matrixes;
   substituting binarization matrixes to be substituted in the set of level-binarization matrixes with the resulted binarization matrixes; and
   according to the substituted set of level-binarization matrixes, forming a substituted threshold matrix, and generating shape-varied dots according to the substituted threshold matrix.

2. The method according to claim 1, characterized in that the substitution binarization matrixes and the binarization matrix to be substituted are the same binarization matrix in the set of level-binarization matrixes, or
   the substitution binarization matrixes and the binarization matrix to be substituted are the different binarization matrixes in the set of level-binarization matrixes.

3. The method according to claim 1, characterized in that substituting binarization matrixes to be substituted in the set of level-binarization matrixes with the resulted binarization matrixes comprises:
   determining substitution binarization matrixes required to be substituted in the set of level-binarization matrixes and auxiliary binarization matrixes, the number of the substitution binarization matrixes being equal to the number of the auxiliary binarization matrixes;
   performing a Boolean operation on the substitution binarization matrixes and the auxiliary binarization matrixes to generate resulted binarization matrixes comprises:
   performing a Boolean operation on the substitution binarization matrixes and the auxiliary binarization matrixes to generate resulted binarization matrixes, wherein in the case that the substitution binarization matrixes and the auxiliary binarization matrixes comprise a same binarization matrix, the same binarization matrix can be only Booleaned with other auxiliary binarization matrixes or substitution binarization matrixes.

4. The method according to claim 1, characterized in that determining substitution binarization matrixes and auxiliary binarization matrixes from the set of level-binarization matrixes comprises:
   determining a material to be printed;
   comparing each image corresponding to a binarization matrix in the set of level-binarization matrix with valid and invalid images in a database showing performance of print images on the print material;
   determining binarization matrixes consistent with the valid images as auxiliary binarization matrixes;
   determining binarization matrixes consistent with the invalid images as substitution binarization matrixes.

5. The method according to claim 1, characterized in that performing a binarization process on a threshold matrix of one or more basic dots according to level thresholds to obtain a set of level-binarization matrixes corresponding to the threshold matrix comprises:

according to a number N of gray scales, normalizing the threshold matrix into N levels;

with a threshold K, comparing each element M in the threshold matrix with the threshold K to obtain a K-level-binarization matrix according to the comparison result, K∈{0, 1, 2, . . . N−1}, so that N level-binarization matrixes are obtained, wherein the N level-binarization matrixes are the set of level-binarization matrixes corresponding to the threshold matrix.

6. The method according to claim 5, characterized in that comparing each element M in the threshold matrix with the threshold K to obtain a K-level-binarization matrix according to the comparison result comprises:

if the threshold K is less than or equal to an element M of the threshold matrix, the value of an element corresponding to the element M in the K-level-binarization matrix is 255;

if the threshold K is greater than the element M in the threshold matrix, the value of an element corresponding to element M in the K-level-binarization matrix is 0.

7. The method according to claim 1, characterized in that the substitution binarization matrixes and the auxiliary binarization matrixes are selected from a set of level-binarization matrixes of a single basic dot; or In the case of a plurality of basic dots, the auxiliary binarization matrixes and the substitution binarization matrixes are selected from different sets of level-binarization matrixes of different basic dots.

8. The method according to claim 7, characterized in that, in the case of a plurality of basic dots, there is at least one main dot and other basic dots are auxiliary dots, wherein all of the substitution binarization matrixes are selected from a set of level-binarization matrixes corresponding to the main dot.

9. The method according to claim 1, characterized in that each set of level-binarization matrixes comprises 256 binarization matrixes.

10. An apparatus for generating dots in image reproduction, comprising:

a binarization module for performing a binarization process on a threshold matrix of one or more basic dots according to level thresholds to obtain a set of level-binarization matrixes corresponding to the threshold matrix;

a selection determination module for determining substitution binarization matrixes and auxiliary binarization matrixes from the set of level-binarization matrixes;

a calculation module for performing a Boolean operation on the substitution binarization matrixes and the auxiliary binarization matrixes to generate resulted binarization matrixes;

a substitution module for substituting binarization matrixes to be substituted in the set of level-binarization matrixes with the resulted binarization matrixes;

a generation module for, according to the substituted set of level-binarization matrixes, forming a substituted threshold matrix, and generating shape-varied dots according to the substituted threshold matrix;

wherein the binarization module, the selection determination module, the calculation module, the substitution module, and the generation module are provided in at least one way selected from: general computer, special-purpose computer, embedded processor, processors of programmable data processing equipment to generate a machine, implemented in program code executable on a computing device; stored in a storage device for execution on a computing device.

11. The apparatus according to claim 10, characterized in that, the binarization module is used to perform a binarization process on the threshold matrix of each selected basic dot to obtain a set of level-binarization matrixes corresponding to the threshold matrix;

the selection determination module is used to determine binarization matrixes to be substituted and auxiliary binarization matrixes, the number of substitution binarization matrixes being equal to the number of the auxiliary binarization matrixes;

the calculation module is used to perform a Boolean operation on the substitution binarization matrixes and the auxiliary binarization matrixes to generate resulted binarization matrixes, wherein if the selected substitution binarization matrixes and the auxiliary binarization matrixes comprise the same binarization matrix, such a binarization matrix may be only Booleaned with another auxiliary binarization matrix or substitution binarization matrix;

the substitution module is used to substitute corresponding substitution binarization matrixes with the resulted binarization matrixes one by one;

the generation module is used to, according to the substituted set of level-binarization matrixes, form a substituted threshold matrix, and generate shape-varied dots according to the substituted threshold matrix.

12. The apparatus according to claim 10, characterized in that the selection determination module is particularly used to:

determine a material to be printed;

compare each image corresponding to a binarization matrix in the set of level-binarization matrix with valid and invalid images in a database showing performance of print images on the print material;

determine binarization matrixes consistent with the valid images as auxiliary binarization matrixes;

determine binarization matrixes consistent with the invalid images as substitution binarization matrixes.

13. The apparatus according to claim 10, characterized in that the binarization module is particularly used to:

according to a number N of gray scales, normalize the threshold matrix into N levels;

with a threshold K, compare each element M in the threshold matrix with the threshold K to obtain a K-level-binarization matrix according to the comparison result, K∈{0, 1, 2, . . . N−1}, so that N level-binarization matrixes are obtained, wherein the N level-binarization matrixes are the set of level-binarization matrixes corresponding to the threshold matrix.

14. The apparatus according to claim 13, characterized in that the comparison rule of the binarization module is:

if a current threshold K is less than a compared element M, in the binarization matrix obtained after the comparison, the value corresponding to element M is 255;

if the current threshold K is greater than the compared element M, in the binarization matrix obtained after the comparison, the value corresponding to element M is 0.

15. The apparatus according to claim 10, characterized in that the selection determination module is particularly used to:

when only one basic dot is selected, select all of the substitution binarization matrixes and the auxiliary binarization matrixes from the same set of level-binarization matrixes;

when a plurality of basic dots are selected, select all of the substitution binarization matrixes from a set of level-binarization matrixes and select some or all of the auxiliary binarization matrixes from another set of level-binarization matrixes.

16. The apparatus according to claim 15, characterized in that, in the case of a plurality of basic dots selected, there is at least one main dot and other basic dots are auxiliary dots, wherein all of the substitution binarization matrixes are selected from a set of level-binarization matrixes corresponding to the main dot.

17. The apparatus according to claim 10, characterized in that each set of level-binarization matrixes comprises 256 binarization matrixes.

18. One or more non-transitory computer-readable mediums having computer-executable instructions thereon, the instructions, when executed on a computer, executing a method of generating dots in image reproduction, the method comprising:

performing a binarization process on a threshold matrix of one or more basic dots according to level thresholds to obtain a set of level-binarization matrixes corresponding to the threshold matrix;

determining substitution binarization matrixes and auxiliary binarization matrixes from the set of level-binarization matrixes;

performing a Boolean operation on the substitution binarization matrixes and the auxiliary binarization matrixes to generate resulted binarization matrixes;

substituting binarization matrixes to be substituted in the set of level-binarization matrixes with the resulted binarization matrixes; and according to the substituted set of level-binarization matrixes, forming a substituted threshold matrix, and generating shape-varied dots according to the substituted threshold matrix.

* * * * *